No. 757,429. PATENTED APR. 19, 1904.
S. ARCE.
SHEARING TOOL.
APPLICATION FILED OCT. 3, 1903.
NO MODEL. 4 SHEETS—SHEET 1.
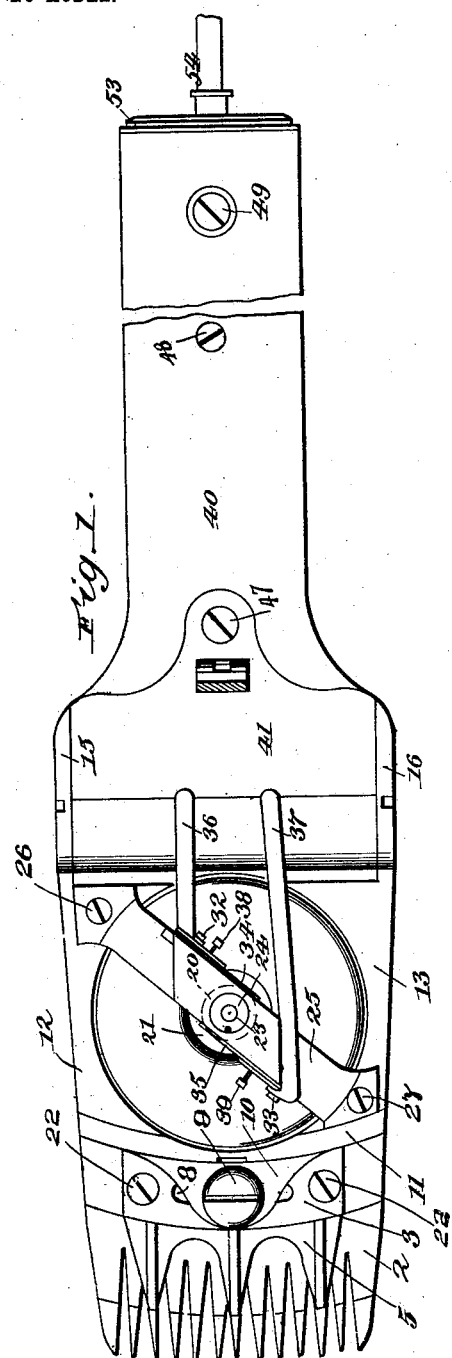
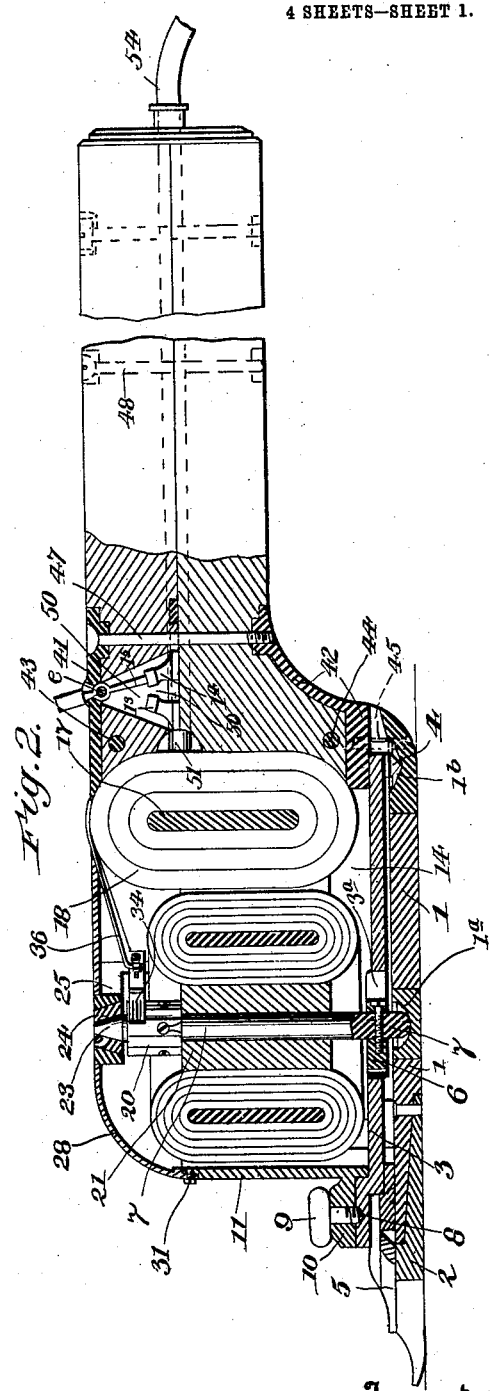
Witnesses
Inventor
Santiago Arce
by Rutherford and Co.
Attorneys No. 757,429. PATENTED APR. 19, 1904.
S. ARCE.
SHEARING TOOL.
APPLICATION FILED OCT. 3, 1903.
NO MODEL. 4 SHEETS—SHEET 2.
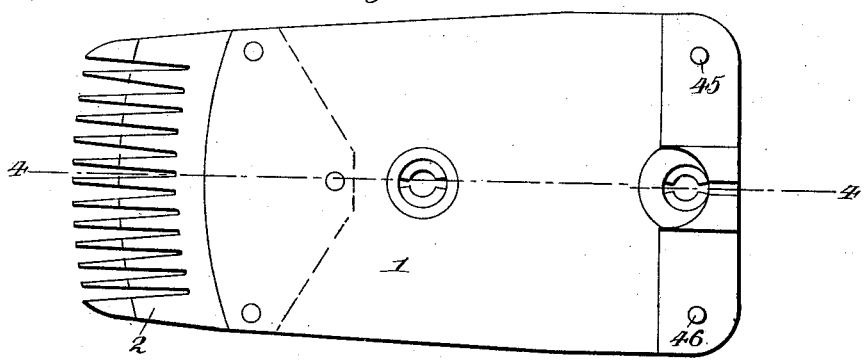
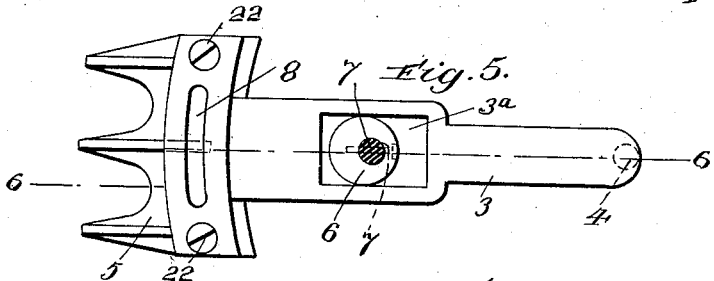
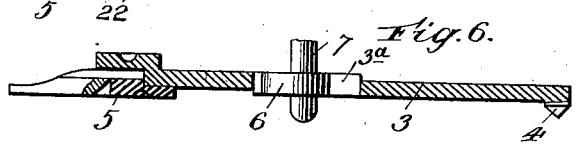
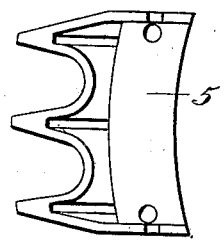
Witnesses
Inventor
Santiago Arce
by Rutherford & Co
Attorneys No. 757,429. PATENTED APR. 19, 1904.
S. ARCE.
SHEARING TOOL.
APPLICATION FILED OCT. 3, 1903.
NO MODEL. 4 SHEETS—SHEET 3.
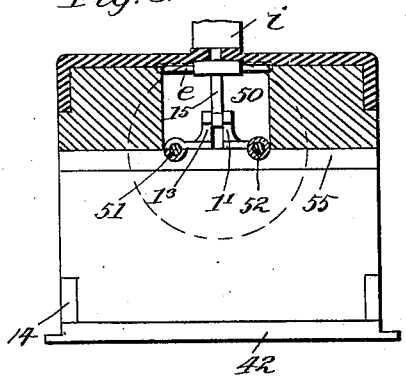
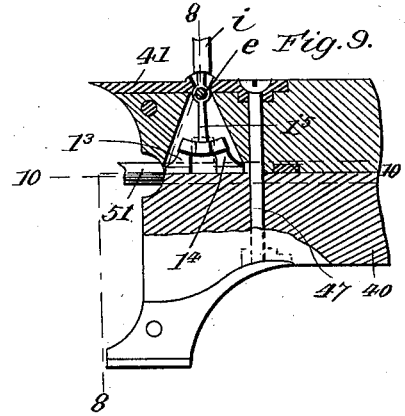
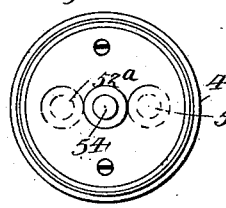
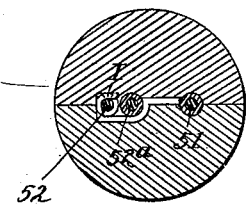
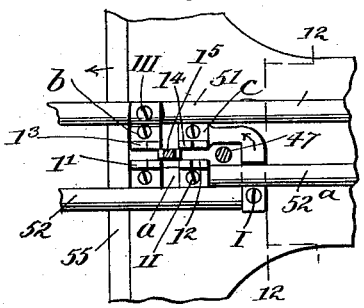
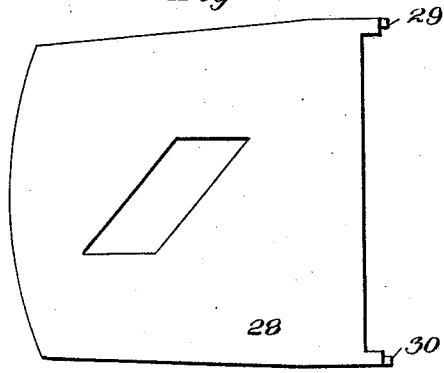
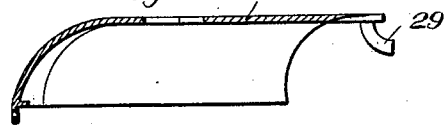
Witnesses
Inventor
Santiago Arce
by Rutherford & Co.
Attorneys No. 757,429. PATENTED APR. 19, 1904.
S. ARCE.
SHEARING TOOL.
APPLICATION FILED OCT. 3, 1903.
NO MODEL. 4 SHEETS—SHEET 4.
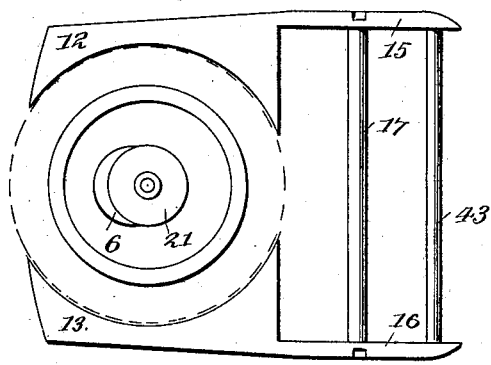
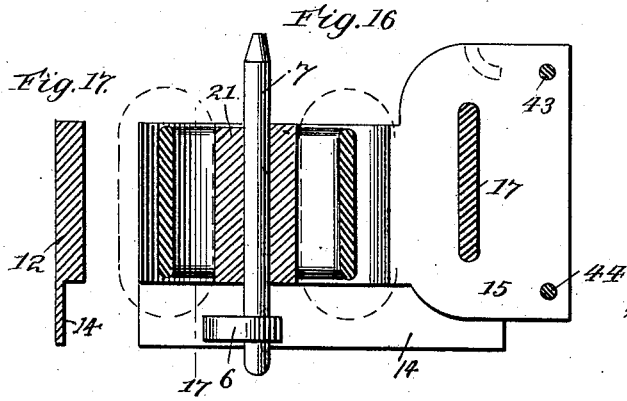
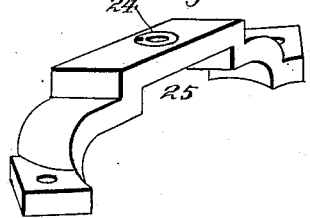
Witnesses
Inventor
Santiago Arce
by Rutherford & Co.
Attorneys No. 757,429. Patented April 19, 1904.

UNITED STATES PATENT OFFICE.

SANTIAGO ARCE, OF BUENOS AIRES, ARGENTINA.

SHEARING-TOOL.

SPECIFICATION forming part of Letters Patent No. 757,429, dated April 19, 1904.

Application filed October 3, 1903. Serial No. 175,606. (No model.)

*To all whom it may concern:*

Be it known that I, SANTIAGO ARCE, a citizen of Argentina, residing at Buenos Aires, federal district, Argentina, have invented certain new and useful Improvements in Shearing-Tools, of which the following is a specification.

My invention relates to electromechanical shearing tools or clippers; and it consists in the novel and advantageous construction hereinafter described, and particularly pointed out in the claims appended.

In the accompanying drawings, forming part of this specification, Figure 1 is a broken plan view of the clipper constituting the preferred embodiment of my invention as the same appears with its cap-plate removed. Fig. 2 is a broken view, partly in longitudinal vertical section and partly in elevation, of the clipper. Fig. 3 is a plan view of the base-plate of the clipper removed. Fig. 4 is a longitudinal central section of the same on line 4 4 of Fig. 3. Fig. 5 is a detail horizontal section illustrating the disposition of the eccentric in the oscillatory cutter-bar. Fig. 6 is a longitudinal central section of the same on line 6 6 of Fig. 5 with the eccentric in elevation. Fig. 7 is a plan view of the cutter removed from the bar. Fig. 8 is a transverse section of the clipper, taken through the controller thereof on the line 8 8 of Fig. 9. Fig. 9 is a detail longitudinal central section taken through the controller. Fig. 10 is a detail horizontal section taken in the plane indicated by the line 10 10 of Fig. 9. Fig. 11 is a rear end elevation of the clipper. Fig. 12 is a transverse section taken in the plane indicated by the line 12 12 of Fig. 10. Fig. 13 is a plan view of the cap-plate removed. Fig. 14 is a longitudinal central section of the same. Fig. 15 is a plan view illustrating the field-magnet and the rotary armature of the clipper. Fig. 16 is a longitudinal central section of the same with parts in elevation. Fig. 17 is a transverse section of the pole-piece 12 of the field-magnet. Fig. 18 is a perspective view of the bracket in which the upper end of the armature-shaft is journaled. Fig. 19 is a plan view illustrating the forward end wall of the clipper and the tension-screw bearing in a lug thereon, and Fig. 20 is a vertical section taken in the plane indicated by the line 20 20 of Fig. 19.

Similar characters designate corresponding parts in all of the views of the drawings, referring to which—

1 is a base-plate of the clipper, having a finger-plate 2 at its forward end and also having bearings $1^a$ and $1^b$.

3 is an oscillatory bar having a journal 4 at its rear end disposed in the bearing $1^b$ of plate 1 and also having an opening $3^a$, preferably rectangular, at an intermediate point of its length and a curvilinear groove 8 in the upper side of its forward portion.

5 is a cutter disposed below and fixedly connected by screws to the forward portion of the bar 3.

7 is an armature shaft or arbor, the lower end 22 of which is stepped in the bearing $1^a$ of the base-plate 1, and 6 is an eccentric fixed on said shaft and disposed in the opening $3^a$ of the bar 3. The armature 21 on the shaft 7 may *per se* be and preferably is of the well-known construction.

In virtue of the construction thus far described it will be observed that when the armature 21 and its shaft 7 are rotated oscillatory motion will be directly transmitted to the bar 3 and the cutter 5 on the latter will be rapidly moved to and fro over the finger-plate 2. It will also be observed that the transmission of motion from the armature-shaft to the oscillatory bar is attended by but a minimum amount of friction and entails the employment of no delicate parts, such as are liable to get out of order after a short period of use.

The field-magnet of the clipper is made up of pole-pieces 12 and 13, Fig. 15, which terminate at their rear ends in plates 15 and 16, and cross-bars 17 and 43, extending between and connecting said plates. The field-coil 18 is wound on the bar 17, which constitutes the core thereof.

20 is a commutator arranged on the armature-shaft 7 in the usual manner; 34 and 35, commutator-brushes arranged to be regulated by screws 38 and 39; 25, a diagonal bracket connected by screws 26 and 27, Fig. 1, to the pole-pieces of the field-magnet and containing a bearing 24, which receives the upper end of the armature-shaft; 28, a cap-plate having lugs 29 and 30, which hold it to the plates 15 and 16 of the field-magnet, and also having a diagonal opening receiving the upwardly-extending portion of the bar 25; 11, a front wall connected to the plate 28 and having a lug 10, in which bears a screw 9 for pressing the cutter-bar against the base-plate; 14 14, plates interposed between the base-plate 1 and the pole-pieces 12 and 13 of the field-magnet and having for their purpose to exclude dirt from the working parts of the clipper; 42, a lower casting fixedly connected by screws 45 and 46, Figs. 2 and 3, to the base-plate 1; 41, an upper casting abutting at its forward end against the rear end of the cap-plate 28; 47, a screw connecting the castings 42 and 41, and 40 40 handle portions, preferably of wood and semicircular in transverse section, connected together by the screws 48 and 49, by the screw 47 to the castings 42 and 41, and by screws 43 and 44 to the plates 15 and 16 of the field-magnet.

It will be observed from the foregoing that with the exception of the cutter 5 the working parts of the clipper are entirely inclosed in the casing formed by the several plates and castings described, and hence dust, dirt, hair, &c., are effectually prevented from gaining access to said parts and interfering with the operation thereof. It will also be observed that the handle formed by the portions 40 is sturdily connected to the casing and is so disposed as to enable the operator to manipulate the device with facility and to the best advantage.

36 and 37 are conductors connected by screws 32 and 33, respectively, to the commutator-brushes 34 and 35, so as to make electrical connection between the field-coil 18 and said brushes; 51 and 52, conductors leading to the field-coil 18; $52^a$, a conductor arranged with the conductor 51 in a cable 54, extending rearwardly from the rear end 53 of the handle; $l'$ and $l^2$, contact-pieces arranged on a part $a$, secured in position by a screw 11 and electrically connected with the conductor $52^a$; $l^3$, a contact-piece arranged on a part $b$, secured by a screw 111 and electrically connected with the conductor 51; $l^4$, a contact-piece electrically connected by a bar $c$ to the conductor 52, and $l^5$ a switch-lever movable between the pairs of contact-pieces $l'\ l^2$ and $l^3\ l^4$, pivoted at $e$ to the casting 41 and having a handle $i$ at its upper end. With the conductors 51 and $52^a$ connected with the opposite poles of an electrogenerator the clipper is controlled by the means just described, as follows: When the switch-lever is thrown between the contact-pieces $l'$ and $l^3$, the current will pass from one pole of the generator through conductor 51, contact-piece $l^3$, switch-lever $l^5$, contact-piece $l'$, and conductor $52^a$ to the opposite pole of the generator, and hence the cutter-bar 3 will be left idle. When, however, the lever $l^5$ is thrown between the contact-pieces $l^2$ and $l^4$, the current will pass through the conductor 51, the coil 18 of the field-magnet, the conductor 52, the conducting-bar $c$, the contact-piece $l^4$, the switch-lever, the contact-piece $l^2$, and the conductor $52^a$ to the other pole of the electrogenerator, and hence the field-magnet will be energized and the cutter-bar 3 actuated. It will also be observed that the speed of the cutter-bar may be readily regulated by shifting the lever $l^5$, since when said lever is in engagement with all of the contact-pieces but a part of the current passes through the coil of the field-magnet.

The contact-pieces $l'$, $l^2$, $l^3$, and $l^4$, together with the switch-lever $l^5$, constitute the controller of the clipper, which controller is arranged in a chamber in the upper portion of the handle, as best shown in Fig. 9.

The location of the switch-lever on the handle of the clipper obviously enables the operator to readily control the cutter-bar irrespective of the position of the clipper with respect to the animal being clipped.

Such changes or modifications may be made in the clipper in practice as fairly fall within the scope of my invention as claimed.

What I claim is—

1. The combination in a clipper of a casing comprising the pole-pieces and the field-coil core of a field-magnet; the pole-pieces terminating at their rear ends in plates 15 and 16, a cap-plate 28 having lugs which hold it to the plates 15 and 16, and also having a diagonal opening, a base-plate 1 having a finger-plate at its forward end, a front wall 11 connected to the plate 28, plates 14 interposed between the base-plate 1 and the pole-pieces of the field-magnet, a lower casting 42 fixedly connected to the base-plate 1, and an upper casting 41 abutting at its forward end against the rear end of the cap-plate, handle portions arranged between the castings 41 and 42 of the casing and connected together and to said castings; and also to the plates 15 and 16; one of said portions having a chamber, a diagonal bracket 25 connected to the pole-pieces of the field-magnet, and having an upwardly-extending portion arranged in the opening of the plate 28, an oscillatory bar pivoted in the casing and having a cutter at its forward end, an armature journaled in the bracket 25 and the base-plate 1, and connected with the oscillatory bar, a field-coil mounted on the core, a commutator intermediate of the field-coil and the armature, and a controller electrically connected with the field-coil and adapted to be connected with a source of electrical energy; said controller being located in the chamber of one handle portion, and having a lever extending therefrom.

2. In a clipper, the combination of a casing comprising the pole-pieces and the field-coil core of a field-magnet, handle portions fixed to said casing; one of said handle portions having a chamber in its inner side, a cutter-bar, an armature mounted in the casing and connected with the cutter-bar, a field-coil mounted on the core, a commutator intermediate of the field-coil and the armature, a controller comprising contact-pieces $l'$ $l^2$, $l^3$ and $l^4$; and a switch-lever movable between the pairs of contact-pieces $l'$ $l^2$ and $l^3$ $l^4$; the said controller being arranged in the chamber of the handle portion with its lever extending therefrom, a conductor 51 connected to the contact-piece $l^3$ and the field-coil, and adapted to be connected to one pole of an electrogenerator, a conductor $52^a$ connected with the contact-plates $l'$ and $l^2$ and adapted to be connected to the opposite pole of an electrogenerator, and a conductor 52 connecting the contact-piece $l^4$ and the field-coil.

In testimony whereof I have signed my name to this specification in presence of two witnesses.

SANTIAGO ARCE.

Witnesses:
I. H. WELLS,
B. MAYER.